United States Patent [19]

Urban et al.

[11] Patent Number: 5,907,579
[45] Date of Patent: May 25, 1999

[54] REPEATER BIPOLAR VIOLATION IN-SERVICE DETECTION SYSTEM

[75] Inventors: Bruce E. Urban, Raleigh; Brian D. Vanvoorhis, Wake Forest; William J. Fox, Raleigh, all of N.C.

[73] Assignee: Alcatel Network Systems, Inc., Raleigh, N.C.

[21] Appl. No.: 08/770,360

[22] Filed: Dec. 20, 1996

[51] Int. Cl.$^6$ .................................................. H04B 3/36
[52] U.S. Cl. .................. 375/211; 375/211; 375/213; 371/5.1; 371/20.2
[58] Field of Search ................................. 375/213, 214, 375/211; 371/20.2, 5.1; 370/243, 246, 249, 293; 379/4, 5, 34

[56] References Cited

U.S. PATENT DOCUMENTS

| | | | |
|---|---|---|---|
| 3,950,622 | 4/1976 | Taylor | 179/175.31 |
| 5,191,595 | 3/1993 | Parsons | 375/3.1 |
| 5,680,405 | 10/1997 | Pesetski et al. | 371/20.2 |
| 5,689,546 | 11/1997 | Sheets et al. | 379/34 |

OTHER PUBLICATIONS

"T–1 maintenance takes a new path" by Dave Marvel et al., *Telephony*, Jun. 15, 1992, pp. 124, 126, 128.

*Primary Examiner*—Stephen Chin
*Assistant Examiner*—Shuwang Liu
*Attorney, Agent, or Firm*—Ware, Fressola, Van Der Sluys & Adolphson LLP

[57] ABSTRACT

A repeater bipolar violation in-service detection system is provided for in-service detection of a bipolar violation in a smart repeater, and includes a repeater bipolar violation in-service detection controller and a repeater bipolar violation in-service detection reporting unit. The repeater bipolar violation in-service detection controller provides a repeater bipolar violation in-service detection control signal containing a control request for information about an in-service detection of a bipolar violation in a smart repeater, and responds to a repeater bipolar violation in-service detection reporting unit signal containing information about the in-service detection of the bipolar violation in the smart repeater. The repeater bipolar violation in-service detection reporting unit responds to the repeater bipolar violation in-service detection control signal from the repeater bipolar violation in-service detection controller, for providing the repeater bipolar violation in-service detection reporting unit signal to the repeater bipolar violation in-service detection controller.

12 Claims, 2 Drawing Sheets

BPV REPORTING SYSTEM

REPEATER BIPOLAR VIOLATION IN-SERVICE DETECTION SYSTEM

BACKGROUND OF THE INVENTION

1. Field of the Invention

The present invention relates generally to a system for monitoring repeaters in a span line; and more particularly, to a system for in-service monitoring of repeater bipolar violations for a T1 span line.

2. Description of the Prior Art

T1 spans have been known in the art for more than 20 years and typically connect together two remote communication points. A T1 span has span lines connected by regenerative repeaters that are each normally spaced about every mile or so in the T1 span. The regenerative repeaters perform various function to a T1 span signal being transmitted over the T1 span, including equalization, clock recovery, pulse detection, and regenerative transmission. One problem in the art is that the regenerative repeaters break down at remote locations along the T1 span causing data errors.

Current T1 spans use smart or intelligent regenerative repeaters that are well known in the art, such as the Txport STARS (span test and restoral system). The smart regenerative repeaters have built-in detection circuits, for providing continuous performance monitoring to each node in the span, as described in *Telephony*, Jun. 15, 1992. The built-in detection circuit may include a bipolar violation detection circuit. However, one major disadvantage of the known T1 spans is that the central office which monitors the T1 span does not receive automatic error detection information from the smart or intelligent regenerative repeaters.

Another major disadvantage of the known T1 spans is that service technicians have to query each repeater to evaluate error detection information in the built-in detection circuits in order to perform fault isolation, which is costly and time-consuming.

Still another major disadvantage of the known T1 spans is that error detection information cannot be obtained while the T1 span is in-service, except for spans using an Extended Super Frame (ESF) datalink. Thus, in order to isolate a fault in a repeater along the T1 span, the T1 span must be taken out of service. Out-of-service fault isolation and maintenance is very expensive because the customer dictates when the T1 span can be worked on and the cost in man/hours escalates if the work needs to be done at night during low traffic hours.

DISCLOSURE OF THE INVENTION

In its broadest sense, the invention provides a repeater bipolar violation in-service detection system for in-service detection of a bipolar violation in a smart repeater. The repeater bipolar violation in-service detection system includes a repeater bipolar violation in-service detection controller and a repeater bipolar violation in-service detection reporting unit.

The repeater bipolar violation in-service detection controller provides a repeater bipolar violation in-service detection control signal containing a control request for information about an in-service detection of a bipolar violation in a smart repeater, and responds to a repeater bipolar violation in-service detection reporting unit signal containing information about the in-service detection of the bipolar violation in the smart repeater.

The repeater bipolar violation in-service detection reporting unit responds to the repeater bipolar violation in-service detection control signal from the repeater bipolar violation in-service detection controller, for providing the repeater bipolar violation in-service detection reporting unit signal to the repeater bipolar violation in-service detection controller.

One important advantage of the repeater bipolar violation in-service detection system is that the central office has error detection information which enables service technicians to isolate faults.

Another important advantage of the repeater bipolar violation in-service detection system is that service technicians do not have to separately query each repeater to evaluate error detection information in the built-in detection circuits in order to perform fault isolation, which thereby saves time and money for isolating faults and maintaining T1 spans.

Another important advantage of the repeater bipolar violation in-service detection system is that a service technician can perform fault isolation while the T1 span is in-service, which accelerates service technician's troubleshooting and minimizes out-of-service repair and maintenance of the T1 span. Moreover, the repeater bipolar violation in-service detection system provides in-service monitoring of T1 span lines at each smart repeater location for all formats of data, including inband T1 message data signals as well as extended super frame (ESF) data signals.

Other advantages will become apparent to those skilled in the art from the following detailed description read in conjunction with the appended claims and drawings attached hereto.

BRIEF DESCRIPTION OF THE DRAWINGS

The drawings, not drawn to scale, include.

BEST MODE FOR CARRYING OUT THE INVENTION

Figure 1:
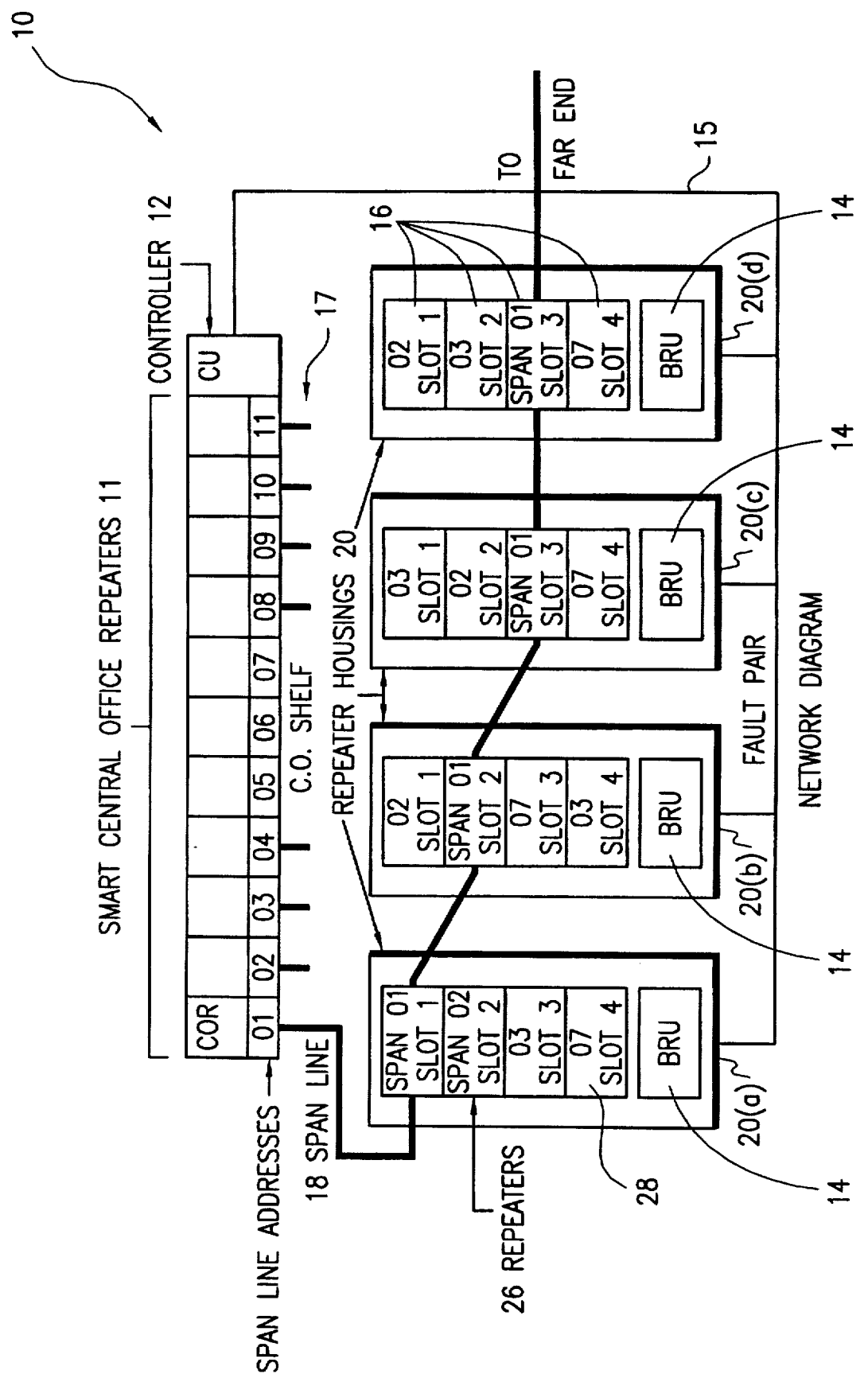
FIG. 1 is a block diagram of a network of T-1 spans.
Figure 2:
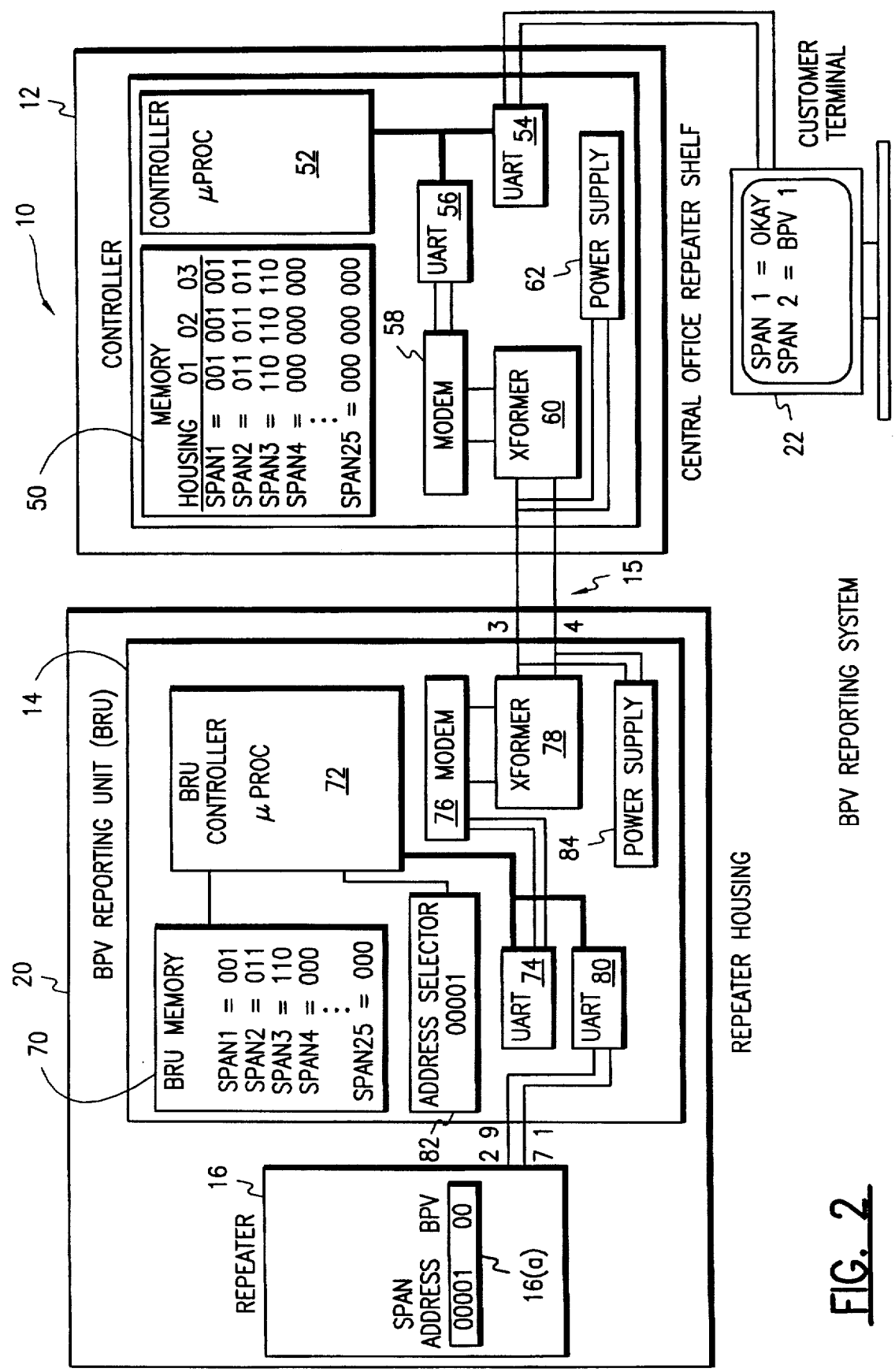
FIG. 2 is a block diagram of a bipolar violation in-service detection system for the network shown in FIG. 1.

In general, FIGS. 1 and 2 show a repeater bipolar violation in-service detection system generally indicated as 10 for in-service detection of a bipolar violation in a smart repeater. The repeater bipolar violation in-service detection system 10 includes a repeater bipolar violation in-service detection controller 12 and a repeater bipolar violation in-service detection reporting unit (BRU) 14.

The repeater bipolar violation in-service detection controller 12 provides a repeater bipolar violation in-service detection control signal on a fault pair generally indicated as 15 in FIG. 1 to the repeater bipolar violation in-service detection reporting unit (BRU) 14. The repeater bipolar violation in-service detection control signal contains a control request for information about in-service detection of a bipolar violation in a smart repeater generally indicated as 16 in FIG. 2.

In response to the repeater bipolar violation in-service detection control signal, the repeater bipolar violation in-service detection reporting unit (BRU) 14 provides a span line identification address signal to the smart repeater 16 (FIG. 2). In response to the span line identification address signal, the smart repeater 16 (FIG. 2) provides a span line address and bipolar violation request signal to the repeater bipolar violation in-service detection reporting unit (BRU) 14. The span line address and bipolar violation request signal contains a request for information about the in-service detection of the bipolar violation in the smart repeater 16 (FIG. 2). Each smart repeater is a T1 span has been previously assigned a span line address in hardware or software which is known the repeater bipolar violation in-service detection controller 12.

In response to the span line address and bipolar violation signal, the repeater bipolar violation in-service detection reporting unit (BRU) 14 provides a repeater bipolar violation in-service detection reporting unit signal back to the repeater bipolar violation in-service detection controller 12 via the fault pair 15. The repeater bipolar violation in-service detection reporting unit signal contains information about the in-service detection of the bipolar violation in the smart repeater via the fault pair 15.

More particularly, as shown in the network diagram in FIG. 1, the repeater bipolar violation in-service detection controller 12 has one or more T1 span lines generally indicated as 17 connected through various repeater housings 20 to a far end remote location. As shown in FIG. 2, the repeater bipolar violation in-service detection controller 12 is contained in a central office repeater shelf and is connected to a customer terminal 22, which is typically a terminal used by a telephone company to monitor the one or more T1 span lines 17. As also shown, the customer terminal 22 provides a visual indication to a customer (i.e. telephone company); such as, that span 1 is okay because it has no bipolar violations, while span 2 is not okay because it has detected bipolar violations at a repeater housing.

As shown in FIG. 1, each repeater housing 20 has one or more repeaters generally indicated as 26. The repeaters 26 are arranged in housing slots generally indicated as 28 and associated with a respective span line 18, which may be a T1 span line. As shown, the span line 18 passes through a first repeater housing 20(a) through a repeater in a housing slot 1, passes through a second repeater housing 20(b) through a repeater in a housing slot 2, passes through a third repeater housing 20(c) through a repeater in a housing slot 3, and passes through a fourth repeater housing 20(d) through a repeater also in a housing slot 3. As shown, each repeater housing 20 has a separate repeater bipolar violation in-service detection reporting unit (BRU) 14.

As shown in FIG. 2, the repeater bipolar violation in-service detection controller 12 has a controller memory 50 for storing information about the status of each span in each respective repeater housing, as discussed below. As shown, the controller memory 50 shows information for three repeater housings each having 25 spans with a respective repeater. The coding of information "000", "001", "011" will be discussed in greater detail below. The repeater bipolar violation in-service detection controller 12 also has a microprocessor controller 52 for driving the operation thereof, which is connected to a first Universal Asynchronous Receiver/Transmitter (UART) 54 for communicating with the customer terminal, a second Universal Asynchronous Receiver/Transmitter (UART) 56 for communicating via a modem 58 and a transformer 60 with the repeater bipolar violation in-service detection reporting unit (BRU) 14. The repeater bipolar violation in-service detection controller 12 also has a power supply 62, as shown.

As also shown in FIG. 2, the repeater bipolar violation in-service detection reporting unit (BRU) 14 has a BRU memory 70 for storing information about the status of each span in a respective repeater housing, as discussed below. As shown, the BRU memory 70 shows information for a respective repeater housing 20 (each having 25 spans with a respective repeater). As discussed above, the coding of information "000", "001", "011" will be discussed in greater detail below. The repeater bipolar violation in-service detection reporting unit (BRU) 14 also has a BRU controller microprocessor 72 for driving the operation thereof, which is connected to a first Universal Asynchronous Receiver/Transmitters (UART) 74 for communicating via a modem 76 and a transformer 78 with the repeater bipolar violation in-service detection controller 12, and a second Universal Asynchronous Receiver/Transmitters (UART) 80 for communicating with the smart repeater 16. The repeater bipolar violation in-service detection reporting unit (BRU) 14 also has an address selector 82 which is set to establish each address for a respective repeater housing 20 in the T1 span. The repeater bipolar violation in-service detection reporting unit (BRU) 14 also has a power supply 84.

In FIG. 2, the repeater bipolar violation in-service detection controller 12 communicates with the repeater bipolar violation in-service detection reporting unit (BRU) 14 via the fault filter slot pins 3, 4, corresponding to fault pair 15 in FIG. 1.

In operation, the repeater bipolar violation in-service detection system 10 uses an existing fault pair 15 and fault filter housing slots (not shown) which are found in current T1 span systems having repeaters. The repeater bipolar violation in-service detection system 10 has the repeater bipolar violation in-service detection reporting unit (BRU) 14 arranged in a fault filter housing slot (not shown) in the repeater housing 20. The repeater bipolar violation in-service detection controller 12 powers and communicates with the repeater bipolar violation in-service detection reporting unit (BRU) 14 via the fault pair 15 at low frequencies. The repeater bipolar violation in-service detection reporting unit (BRU) 14 communicates to the smart repeater 16 (FIG. 2) over pins 2 and 7 which were previously used as fault locate outputs in the prior art. The repeater bipolar violation in-service detection reporting unit signal has information coded and passed from the smart repeater 16 (FIG. 2) through the repeater bipolar violation in-service detection reporting unit (BRU) 14 back to the repeater bipolar violation in-service detection controller 12 (i.e. central office controller) which interprets the data and indicates the location of bipolar violations within the T1 span.

The purpose of the repeater bipolar violation in-service detection system 10 is to identify the starting location of bipolar violations down to the repeater housing in a "live traffic" smart T1 span line. Identifying the location of the problem while the T1 span is "in-service" reduces fault isolation time and reduces the time a span line must be "out-of-service" for maintenance and repair.

The repeater bipolar violation in-service detection controller 12 (i.e. central office controller) initiates the retrieval of information by powering the fault pair 15 at an interval (constant, 5 min., 15 min., 1 hr, 2 hrs or 12 hrs) set by the user. Once power is applied, the repeater bipolar violation in-service detection controller 12 will request information from each repeater bipolar violation in-service detection reporting unit (BRU) 14 by transmitting a repeater bipolar violation in-service detection reporting unit address on the fault pair 15. While waiting for a specific repeater bipolar violation in-service detection reporting unit address on the fault pair, each repeater bipolar violation in-service detection reporting unit (BRU) 14 requests a response from each repeater 16 (FIG. 2) in an associated repeater housing 20 by transmitting a serial span line identification address request signal on pin 2 to receive a response from the addressed repeater 16 (FIG. 2).

The span line addresses are determined by the smart central office repeater at the beginning of the span, and the address selector 82 in each repeater bipolar violation in-service detection reporting unit (BRU) 14 is set. Upon powering up of a T1 span line (60 Ma loop current detected), the smart control office repeaters 11 (Central Office repeater) sends an inband T1 message to all smart repeaters which are stored in the span line address register. A switch selection allows the user to select a span number from 1 to 25 on the smart control office repeaters 11 (Central Office repeater). The limit of 25 is due to the limit of smart central office repeaters per controller, although the scope of the invention is not intended to be limited to such a number.

In response to the serial span line identification address request signal on pin 2, the smart repeater 16 (FIG. 2) transmits a respective span line address and bipolar violation information signal from a span line identification address and bipolar violation register 16(a) to pin 7. The span line address part of the signal is six bits. The bipolar violation information part of the signal has two bits of bipolar violation information, wherein the first bit is side one (i.e. upstream) and the second bit is side two (downstream). Each bit is either a high signal which indicates a bipolar violation over a predetermined threshold, or a low signal indicating no problems. Once the information is transmitted, the smart repeater 16 clears its register.

The repeater bipolar violation in-service detection reporting unit (BRU) 14 checks for all 25 span line addresses and stores the respective responses. If no response was received from a given span line address, the repeater bipolar violation in-service detection reporting unit (BRU) 14 loads a "not-in-service" message in that address location. Once all bipolar violation registers in the BRU memory have been checked, the repeater bipolar violation in-service detection reporting unit (BRU) 14 transmits the repeater bipolar violation in-service detection reporting unit signal to the repeater bipolar violation in-service detection controller 12, containing information about the in-service detection of the bipolar violation in the smart repeater 16 in the housing 20. In particular, the repeater bipolar violation in-service detection reporting unit signal includes a respective address and bipolar violation information and is serially transmitted back to the repeater bipolar violation in-service detection controller 12. The address identifies the location of the repeater bipolar violation in-service detection reporting unit (BRU) 14 in the T1 span and can be set for 32 unique locations. It is important to point out that the scope of the invention is not intended to be limited to any particular manner of transmission, the number of address bits, the number of bipolar violation information bits, etc.

The information transmitted by the repeater bipolar violation in-service detection reporting unit (BRU) 14 to the repeater bipolar violation in-service detection controller 12 is one byte long, three bits for bipolar violation data plus five bits for the span line address. Bit one of the three bipolar violation data bits is a service status bit that determines repeater service status (e.g. "1"="in-service" or "0"="not-in-service"). Bits two and three are service direction status bits that determine repeater service direction status ("11"= both sides erroring, "01"=side one erroring, "10"=side two erroring and "00"=both sides good).

After receiving the repeater bipolar violation in-service detection reporting unit signal, the repeater bipolar violation in-service detection controller 12 transmits the next address on the fault pair until all the repeater bipolar violation in-service detection reporting units (BRU) 14 have been checked. At this time, the controller powers down the fault pair 15 to converse power. The repeater bipolar violation in-service detection controller 12 then provides a report via the user selected media (i.e., terminal, printer), as shown for example in FIG. 2.

The present invention generally has applications and capabilities in systems not using an Extended Super Frame (ESF) data link. However, the scope of the invention is also intended to cover use of the invention in systems using ESF data links.

Although the present invention has been described and discussed herein with respect to one or more embodiments, other arrangements or configurations are possible which do not depart from the spirit and scope hereof. Hence, the present invention is deemed limited only by the appended claims and the reasonable interpretation thereof.

What is claimed is:

1. A repeater bipolar violation in-service detection system for in-service detection of a bipolar violation in a smart repeater, comprising:

a repeater bipolar violation in-service detection controller, for providing a repeater bipolar violation in-service detection control signal containing a control request for information about an in-service detection of a bipolar violation in a smart repeater, and being responsive to a repeater bipolar violation in-service detection reporting unit signal containing information about the in-service detection of the bipolar violation in the smart repeater; and a repeater bipolar violation in-service detection reporting unit, responsive to the repeater bipolar violation in-service detection control signal from the repeater bipolar violation in-service detection controller, for providing the repeater bipolar violation in-service detection reporting unit signal to the repeater bipolar violation in-service detection controller.

2. A repeater bipolar violation in-service detection system according to claim 1, wherein the repeater bipolar violation in-service detection reporting unit provides a span line identification address signal to the smart repeater, and responds to a span line address and bipolar violation signal from the smart repeater with the information about the in-service detection of the bipolar violation in the smart repeater.

3. A repeater bipolar violation in-service detection system according to claim 2, wherein the repeater bipolar violation in-service detection reporting unit provides the span line identification address signal over pin 2 to the smart repeater, and responds to the span line address and bipolar violation signal over line 7 from the smart repeater.

4. A repeater bipolar violation in-service detection system according to claim 1, wherein the repeater bipolar violation in-service detection controller provides the repeater bipolar violation in-service detection control signal to the repeater bipolar violation in-service detection reporting unit by powering a fault pair at one of a plurality of predetermined intervals.

5. A repeater bipolar violation in-service detection system according to claim 1, wherein the repeater bipolar violation in-service detection controller further comprises:

a repeater bipolar violation in-service detection controller memory means for storing the information about the in-service detection of the bipolar violation in repeaters in a plurality of spans.

6. A repeater bipolar violation in-service detection system according to claim 1, wherein the repeater bipolar violation in-service detection system further comprises a repeater housing having a fault filter slot for containing the repeater bipolar violation in-service detection reporting unit.

7. A repeater bipolar violation in-service detection system according to claim 1, wherein the repeater bipolar violation in-service detection controller and the repeater bipolar violation in-service detection reporting unit communicate over an existing pair of fault lines.

8. A repeater bipolar violation in-service detection system according to claim 1, wherein the repeater bipolar violation in-service detection controller provides power to the repeater bipolar violation in-service detection reporting unit over an existing pair of fault lines.

9. A repeater bipolar violation in-service detection system according to claim 1, wherein the repeater bipolar violation in-service detection reporting unit further comprises:

a repeater bipolar violation in-service detection reporting unit memory means for storing the information about the in-service detection of the bipolar violation in the repeater.

10. A repeater bipolar violation in-service detection system according to claim 1, wherein the repeater bipolar violation in-service detection reporting unit further comprises:

a repeater bipolar violation in-service detection reporting unit controller for controlling the processing of the information about the in-service detection of the bipolar violation in the repeater.

11. A repeater bipolar violation in-service detection reporting unit for using in a repeater bipolar violation in-service detection system for in-service detection of a bipolar violation in a repeater, the repeater bipolar violation in-service detection system having a repeater bipolar violation in-service detection controller, for providing a repeater bipolar violation in-service detection control signal containing a control request for information about an in-service detection of a bipolar violation in the repeater, and being responsive to a repeater bipolar violation in-service detection reporting unit signal containing information about the in-service detection of the bipolar violation in the repeater, the repeater bipolar violation in-service detection reporting unit being responsive to the repeater bipolar violation in-service detection control signal from the repeater bipolar violation in-service detection controller, for providing the repeater bipolar violation in-service detection reporting unit signal to the repeater bipolar violation in-service detection controller.

12. A repeater bipolar violation in-service detection controller for using in a repeater bipolar violation in-service detection system for in-service detection of a bipolar violation in a repeater, the repeater bipolar violation in-service detection system having a repeater bipolar violation in-service detection reporting unit, responsive to a repeater bipolar violation in-service detection control signal containing a control request for information about an in-service detection of a bipolar violation in the repeater, for providing a repeater bipolar violation in-service detection reporting unit signal containing information about the in-service detection of the bipolar violation in the repeater, the repeater bipolar violation in-service detection controller for providing the repeater bipolar violation in-service detection control signal, and being responsive to the repeater bipolar violation in-service detection reporting unit signal.

* * * * *